(12) United States Patent
Cheng et al.

(10) Patent No.: US 8,364,026 B2
(45) Date of Patent: Jan. 29, 2013

(54) VIDEO PLAYBACK SYSTEM AND METHOD

(75) Inventors: Kai-Yin Cheng, Taipei (TW); Sheng-Jie Luo, Taipei (TW); Bing-Yu Chen, Taipei (TW); Hao-Hua Chu, Taipei (TW)

(73) Assignee: National Taiwan University, Taipei (TW)

( * ) Notice: Subject to any disclaimer, the term of this patent is extended or adjusted under 35 U.S.C. 154(b) by 364 days.

(21) Appl. No.: 12/728,136

(22) Filed: Mar. 19, 2010

(65) Prior Publication Data
US 2010/0322594 A1 Dec. 23, 2010

(30) Foreign Application Priority Data
Jun. 19, 2009 (TW) ............................... 98120754 A

(51) Int. Cl.
*H04N 5/783* (2006.01)
(52) U.S. Cl. ........................................ 386/343; 386/345

(58) Field of Classification Search .................. 386/343, 386/345, 346, 347, 350, 351
See application file for complete search history.

(56) References Cited

U.S. PATENT DOCUMENTS
5,377,051 A * 12/1994 Lane et al. .................... 386/314
2008/0037953 A1 * 2/2008 Kawamura et al. ............. 386/75
2011/0205436 A1 * 8/2011 Kondo et al. .................. 348/571

FOREIGN PATENT DOCUMENTS
JP 410243351 A * 9/1998

* cited by examiner

*Primary Examiner* — Robert Chevalier

(57) ABSTRACT

A method in a video playback system for playing a video with a specific playback speed in accordance with a video feature and a playback record is described. The system allows the playback record records a preceding playback speed corresponding to the video previously played to learn user preferences for a user. This makes the specific playback speed more suitable for the user without any adjustment. In addition, the system also allows the user input a resetting playback speed to actively adjust the specific playback speed if the original specific playback speed is not suitable for the user.

17 Claims, 3 Drawing Sheets

VIDEO PLAYBACK SYSTEM AND METHOD

FIELD OF THE INVENTION

The invention is related to a playback system and method, more particularly to a video playback system and method.

BACKGROUND OF THE INVENTION

Recent developments in digital multimedia technologies have made it easy for people to download, record, and watch videos on a variety of media access devices. Additionally, inexpensive mass storage devices enable people to stock unwatched video content on hard disks. Despite the fact that digital content recording and storing technologies continue to improve over time, the technologies of video playback systems have not changed much. The common video players such as QuickTime player, PowerDVD, Media Player, and RealOnePlayer offer comparable sets of simple controls for playing, pausing, stopping, fast-forwarding and rewinding/reversing video.

However, there are some problems in using the above video players. When users have no enough patience or time to watch the entire contents of a video, they are obliged to manually skim and fast-forward to locate content of interest to watch in fine detail, which often involves tedious work on the user's part. Furthermore, based on researches, every user is dissimilar and has different preferences. This makes that the present video player could neither satisfy every user nor memorize user preferences to play the video.

Hence, intelligent playback mechanism is demanded to help users to efficiently skim through and fast-forward lengthy and boring content. Although the playback system which can detect the specific events is invented, it has some problems such as quickly changed playback speed which would cause inconveniences for users. Those pending problems that are yet not solved are imperative to be overcome.

Therefore, to overcome the drawbacks from the prior art and to meet the present needs, the Applicant dedicated in considerable research, and finally accomplishes the "video playback system and method" of the present invention, which overcomes the above drawbacks. The present invention is briefly described as follows.

SUMMARY OF THE INVENTION

To solve the above drawbacks, the present invention is related to a video playback system and method which can generate a specific playback speed based on video feature and users' preferences to concretely realize a personal and customized playback device.

Based on the above conception, there is a video playback method for playing a video having a specific event and a normal event including steps of: (A) providing a playback record of the video; (B) generating a first browsing speed in accordance with the playback record; and (C) playing the video with the first browsing speed if the specific event is played.

Preferably, the video has a plurality of video features and the step (B) of the method further includes a step (B1) of generating a first playback speed for the specific event, a second playback speed for the normal event in accordance with the plurality of video features, and a second browsing speed in accordance with the playback record.

Preferably, the normal event has a plurality of frames and the step (B1) of the method further includes steps of: (B11) extracting the specific event and the normal event from the video; (B12) computing a complexity of the normal event in accordance with a difference between two specific ones of the plurality of frames in the normal event; (B13) generating the first playback speed and the second playback speed in accordance with the specific event and the complexity; and (B14) playing the video respectively with the first playback speed for the specific event and with the second playback speed for the normal event if the playback record of the video is absent, and playing the video with the second browsing speed for the normal event if the playback record of the video is provided.

Preferably, the step (B12) of the method further includes at least one step of: computing the complexity of the normal event in accordance with a pixel difference between the two frames; computing the complexity of the normal event in accordance with a pixel moving distance between the two frames; and computing the complexity of the normal event in accordance with respective moving distances of a plurality of feature points between the two frames.

Preferably, the steps of the method further include a step of showing the specific event and the complexity on a user interface respectively by different colors.

Preferably, the steps of the method further include steps of: inputting a resetting playback speed; and adjusting the first and the second browsing speeds in accordance with the resetting playback speed.

Preferably, the steps of the method further include a step of weightedly averaging the resetting playback speed and one of the first and the second browsing speeds to adjust the first and the second browsing speeds.

Preferably, the steps of the method further include a step of playing the video with the specific playback speed during a playback interval of the video, wherein the playback interval is one selected from a group consisting of a shot, a scene, a sequence and the specific event.

Preferably, the specific event is one selected from a group consisting of a sport event, an art event, a wedding event, a movie event, a news event and a combination thereof.

Preferably, the playback record records a preceding playback speed corresponding to the video previously played, and the specific playback speed is adjusted by an adjusting unit being 0.1 time of the specific playback speed.

Based on the above conception, there is a video playback method for playing a video having a video feature and a playback record with a specific playback speed, including steps of: (A) generating a predetermined playback speed in accordance with the playback record; (B) detecting whether a resetting playback speed is received; and (C) playing the video with the specific playback speed generated in accordance with the resetting playback speed and the predetermined playback speed if the resetting playback speed is received.

Preferably, the step (A) of the method further includes steps of: detecting the video to obtain the video feature; generating a first playback speed in accordance with the video feature; generating a second playback speed in accordance with the playback record; and determining the predetermined playback speed in accordance with the first playback speed and the second playback speed.

Preferably, the steps of the method further includes a step of playing the video with the specific playback speed at a playback interval of the video, wherein the playback interval is one selected from a group consisting of a shot, a scene, a sequence and a specific event.

Preferably, the specific playback speed is adjusted by an adjusting unit being 0.1 time of the specific playback speed.

Preferably, the step (C) of the method further includes steps of: playing the video with the specific playback speed generated in accordance with the predetermined playback speed if the resetting playback speed is absent; and generating the specific playback speed by weightedly averaging the resetting playback speed and the predetermined playback speed.

Based on the above conception, there is a video playback system for playing a video with a specific playback speed, including a recording unit recording a playback record of the played video.

Preferably, the video has a plurality of frames and the video playback system further includes: a micro processor coupled to the recording unit and generating a browsing speed in accordance with the playback record; a motion processor detecting a difference between two specific ones of the plurality of frames to compute a video complexity; an event processor detecting the video to extract a specific event therefrom; and a speed regulator coupled to the micro processor, the motion processor and the event processor and determining the specific playback speed in accordance with one selected from a group consisting of the specific event, the video complexity, the browsing speed, and a combination thereof.

Preferably, the motion processor computes the complexity in accordance with the difference being one selected from a group consisting of a pixel differences between the two frames, a moving distance of a specific pixel between the two frames, and respective moving distances of a plurality of feature points between the two frames and a combination thereof.

Preferably, the specific event is one selected from a group consisting of a sport event, an art event, a wedding event, a movie event, a news event and a combination thereof.

Preferably, the speed regulator keeps the specific playback speed in constant during a playback interval of the video, generates a first playback speed and a second playback speed respectively in accordance with the specific event and the video complexity, and chooses one of the first playback speed and the second playback speed to be the specific playback speed under a predefined condition.

Preferably, the playback interval is one selected from a group consisting of a shot, a scene, a sequence and the specific event.

Preferably, the micro processor receives a resetting playback speed and weightedly averages the resetting playback speed and the specific playback speed to generate a preferable browsing speed to play the video.

DETAILED DESCRIPTION OF THE PREFERRED EMBODIMENT

The advantages of the present invention will become more readily apparent by reviewing the following detailed descriptions and accompanying drawings.

Figure 1:
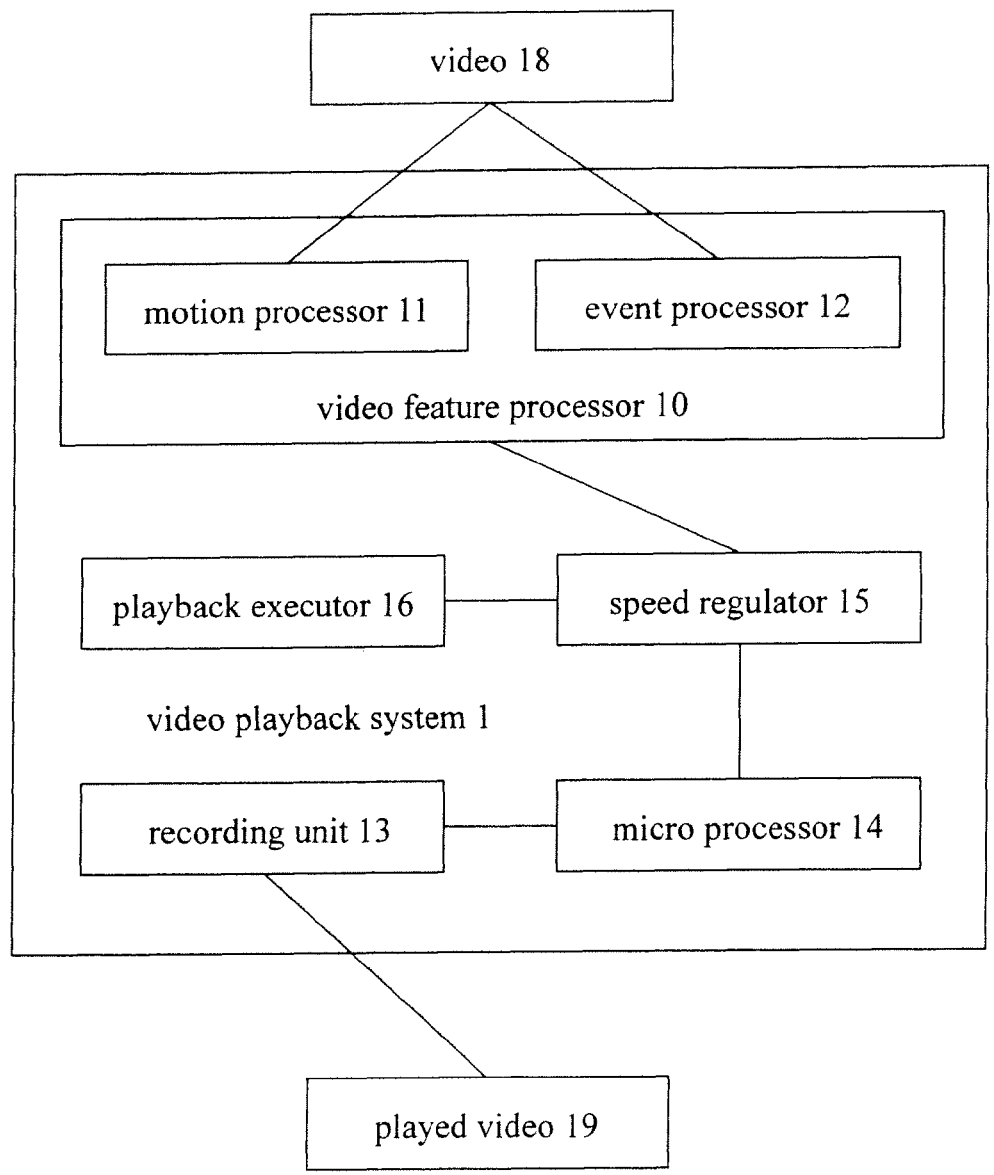
FIG. 1 is a diagram which schematically illustrates the video playback system according to the preferred embodiment of the present invention.

FIG. 1 schematically illustrates the video playback system according to the preferred embodiment of the present invention. The video playback system 1 includes a motion processor 11, an event processor 12, a recording unit 13, a micro processor 14 coupled to the recording unit, and a speed regulator 15 coupled to the micro processor, the motion processor and the event processor. An intelligent playback mechanism in the video playback system 1 could be used to adjust a specific playback speed to play a video 20, wherein the specific playback speed could be adjusted according to the video feature and user preferences. Therefore, the specific playback speed is adaptable and generated appropriately for the user according to different kinds of the video feature.

A difference between two specific ones of the plurality of frames in the video 20 could be detected by the motion processor 11 in the video playback system to compute a video complexity (one of the video features). The motion processor 11 could further detect a pixel difference, a pixel moving distance and respective moving distances of a plurality of feature points between the two frames in the video 20. The complexity of the video 20 would be computed by one of the above differences or a combination thereof.

The method for computing the complexity in the preferred embodiment of the prevent invention would be pointed out specifically. Preferably, a motion magnitude for converting into the specific playback speed is computed with respective moving distances of a plurality of feature points between two frames using the equation as follows.

$$M_f = \frac{\sum_{i=0}^{N-1} \|V_i\|}{N \cdot \max(\|V_i\|)} \quad \text{Formula (1)}$$

In the formula 1, i is a feature point in the current frame f, $V_i$ is the motion vector to the next frame f+1, N is number of pixels in one frame and max $V_i$ is a predefined vector which is a max vector selected from all motion vectors in the video. If $M_f\sim 0$ represents that the motion magnitude is very small, the specific playback speed is set to be maximum speed by speed regulator 15. If $M_f\sim 1$ represents that the motion magnitude is huge, the specific playback speed is set to be normal speed. According to the formula 1, the specific playback speed is set proportionally to be a value between maximum speed and normal speed according to the motion magnitude $M_f$. In the formula 1, the feature point can be substituted for the pixel and the next frame can be substituted for any other frame. In fact, a difference between two specific ones of the plurality of frames in the video 20 can be used to compute in the present invention.

The event processor 12 can detect a video 20 to extract a specific event, wherein the specific event is a sport event, an art event, a wedding event, a movie event, a news event or a combination thereof. Since detecting the specific event is a prior art in the present invention, there is no need to elaborate it.

The motion processor 11 and the event processor 12 can simultaneously or respectively detect the video 20 to analyze the contents thereof and transmit the information of the specific event and the complexity to the speed regulator 15. In other words, signals of the specific event and the complexity from the video 20 are generated to transmit to the speed regulator 15 by the motion processor 11 and the event processor 12. In addition, the specific event and the complexity in the present invention could be showed on a user interface respectively by different colors such as using a slider bar or a display area. For example, if the complexity of the video feature is higher than a predefined magnitude, it could be showed by deep color. Furthermore, different kinds of the specific events would be showed by different colors such as yellow for the wedding event and green for the sport event. In prior art, there is a slider bar on the user interface in some video players and a cursor on the slider bar could be moved by the user only to fast-forward the video. There is no function except for fast-forwarding the video. Therefore, there are more functions of the slider bar in the present invention so that the user can easily find out the contents interesting thereto according to the color showed on the slider bar. Furthermore, the visual representation methods such as using grayscale or other methods to show the video features is included in the preferred embodiment of the present invention. Moreover, a display area configured on the user interface for showing the video features is also included in the preferred embodiment of the present invention.

The speed regulator 15 is coupled to the motion processor 11 and the event processor 12. The specific playback speed can be generated to play the video 20 in accordance with the specific event, the complexity, or a combination thereof. There is a predetermined condition in the speed regulator. For example, the specific playback speed is set corresponding to a predetermined magnitude of the complexity and/or a specific event. Then, when the information of the event and the complexity is transmitted to speed regulator 15, the specific playback speed can be generated corresponding thereto to order a playback executor 16 to play the video 20, wherein the playback executor 16 is coupled to the speed regulator 15 and a order therefrom would be performed by the playback executor 16.

A first playback speed and a second playback speed are respectively generated in accordance with the specific event and the complexity by the speed regulator 15. The specific playback speed would be selected from the first playback speed, the second playback speed or a browsing speed in accordance with a predefined condition thereby. The predefined condition is used to determine a priority order of above playback speed. For example, the browsing speed is prior to the first playback speed, and the first playback speed is prior to the second playback speed. Therefore, the specific playback speed to play the video 20 would be determined by the speed regulator in accordance with the predefined condition without any conflict. Since the specific playback speed is corresponding to the complexity and/or the event, the specific playback speed for the video 20 is at least one changeable magnitude and could be changed during playing due to user's adjustment.

A playback record is recorded for the user by the recording unit 13 in the video playback system, wherein the playback record is the specific playback speed corresponding to a played video 21. In other words, the playback record is generated based on the specific playback speed corresponding to video features like the complexity and the specific event from the played video 21. Then, the playback record would be input from the recording unit 13 to the personal processor 14.

The micro processor 14 is coupled to the recording unit 13 to receive the playback record thereform. The browsing speed is generated by the micro processor 14 in accordance the playback record. In addition, a preferable browsing speed can be computed using the formula as follows.

$$S'_e = \alpha S_e + (1-\alpha) S_e^u \qquad \text{Formula (2)}$$

A resetting playback speed $S_e^u$ from the user can be received by the personal process 14 and weightedly averaged with "the original specific playback speed $S_e$" to generate "the preferable browsing speed $S'_e$" to play the video. In the preferred embodiment of the present investment, α is a magnitude between 0 and 1, more particularly to 0.95 since the user often adjust too much. In order to solve the problem, the preferable browsing speed is generating by weightedly averaging the original playback speed $S_e$ and the resetting playback speed $S_e^u$ to prevent from the handicap resulted form changing the specific playback speed too much during watching the video. In addition, e is an event type which represents that different events are corresponding to different playback speeds. In addition, normal event can be defined as a specific event to discriminate easily in the preferred embodiment of the present investment. The original playback speed $S_e$ can be generated not only from the playback record but also from the video feature based on the playing video 20.

In addition, if the specific playback speed is continuously generated based on the video features like the specific event and the complexity, the specific playback speed will be changed continuously during playing. This is not convenient for the user to watch the video. In order to provide the fluent and steady playback speed, the speed regulator 15 keeps the specific playback speed in constant during a playback interval of the video, wherein the playback interval is a shot, a scene, a sequence or the specific event. This makes the better visual perception for the user.

In fact, in the preferred embodiment of the present investment the motion processor 11 and the event processor 12 can be combined as a video feature processor 10 coupled to the speed regulator 15. The video feature processor 10 can receive at least one video facture selected from a group consisting of the specific event, blur degree of the edge, complexity, blink frequency, respective moving distances of a plurality of feature points, the pixel difference, and the pixel moving distance and the information of the video features would be inputted to the speed regulator 15.

In order to understand the present investment, there are the description of the preferred embodiment described by different elements, processors and steps. However, it is to be understood that the invention should not be limited to the disclosed embodiment. On the contrary, it is intended to cover numerous modifications and variations included within the spirit and scope of the appended claims which are to be accorded with the broadest interpretation so as to encompass all such modifications and variations. Therefore, the above description and illustration of the each element are references and should not be taken as limiting the scope of the present invention which is defined by the appended claims.

Figure 2:
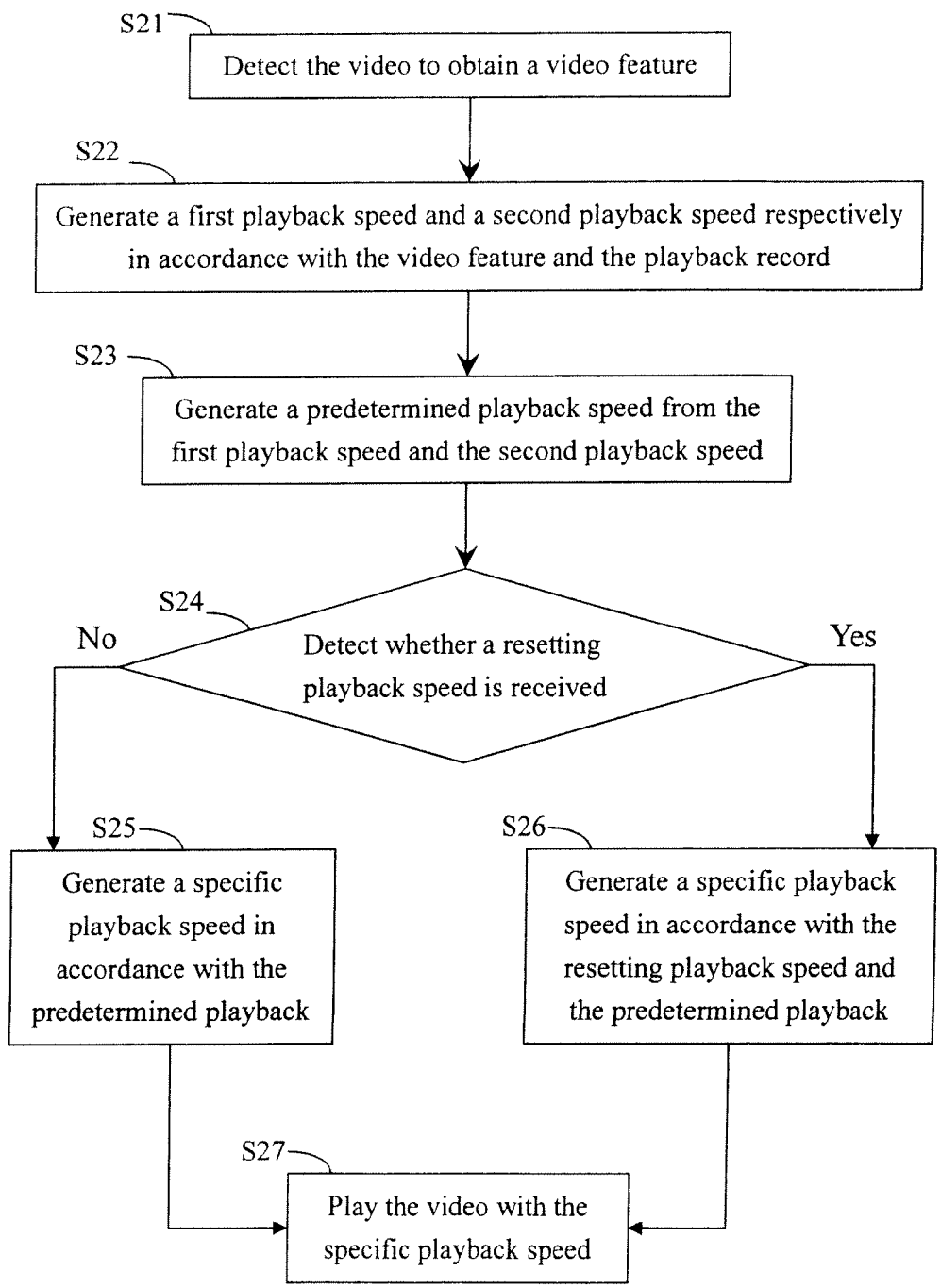
FIG. 2 is a diagram which schematically illustrates a process for the video playback method according to the first preferred embodiment of the present invention.

FIG. 2 schematically illustrates a process for the video playback method according to the first preferred embodiment of the present invention. A video playback method for playing a video having a video feature and a playback record with a specific playback speed determined by a predefined condition, includes steps of: (S21) detecting the video to obtain a video feature; (S22) generating a first playback speed and a second playback speed respectively in accordance with the video feature and the playback record; (S23) generating a predetermined playback speed from the first playback speed and the second playback speed; (S24) detecting whether a resetting playback speed is received; (S25) generating a specific playback speed in accordance with the predetermined playback if the resetting playback speed is absent; (S26) generating a specific playback speed in accordance with the resetting playback speed and the predetermined playback if the resetting playback speed is received; and (S27) playing the video with the specific playback speed.

In the above method of the first preferred embodiment, the playback speed set at once and the playback record of the user must be first considered for the determination of the specific playback speed because of the predefined condition. In the step (S21), the video 20 is detected and/or extracted to compute for the video feature, for example by the video feature processor 10. It could be the basis of the specific playback speed. In the step (S22), a first playback speed and a second playback speed are generated respectively in accordance with the video feature and the playback record. The specific playback speed corresponding to the played video is recorded as the playback record by a recording unit to generate the second playback speed by a micro processor. In the step (S23), the first playback speed is regarded as a predetermined playback speed by a speed regulator if the playback record is absent, while the second playback speed is regarded as the predetermined playback speed by a speed regulator if the playback record is provided. In the step (S24) a resetting playback speed is detected for the following steps.

In the step (S25), the video would be played with the specific playback speed generated in accordance with the predetermined playback speed if the resetting playback speed is absent. In other words, the first playback speed or the second playback speed would be regarded as the specific playback speed for playing the video. In the step (S26), the specific playback speed would be generated by weightedly averaging the resetting playback speed and the predetermined playback speed to play the video. In fact, the user can adjust the specific playback speed to generate the resetting playback speed actively so the specific playback speed is generated passively based on some formulas like formula 2. In addition, if the user tries to adjust the specific playback speed, it would be preferably adjusted by an adjusting unit being 0.1 time thereof. The adjusting unit is high enough for the user to feel the difference. In fact, the specific playback speed must be adjusted gradually without influencing the user during the video playing.

In above method, if a specific event is used to be the video feature, the step for extracting the specific event would be added for playing the video. If other features except the specific event are used to be the video feature, the step for dividing the video into the specific event and a normal event is added to prevent the possible conflict therebetween. Certainly, after the dividing step, the step for the normal event further includes one of the steps of: computing a complexity of the normal event in accordance with a difference between two frames; computing the complexity of the normal event in accordance with a pixel difference between two frames; computing the complexity of the normal event in accordance with a pixel moving distance between two frames; and computing the complexity of the normal event in accordance with respective moving distances of a plurality of feature points between two frames.

In addition, in order to provide the fluent and steady playback speed, the video would be play with the specific playback speed at a playback interval of the video, wherein the playback interval is a shot, a scene, a sequence, or a specific event. The specific playback speed must keeps constant during the playback interval of the video so as to be generated a better visual experience for the user.

Figure 3:
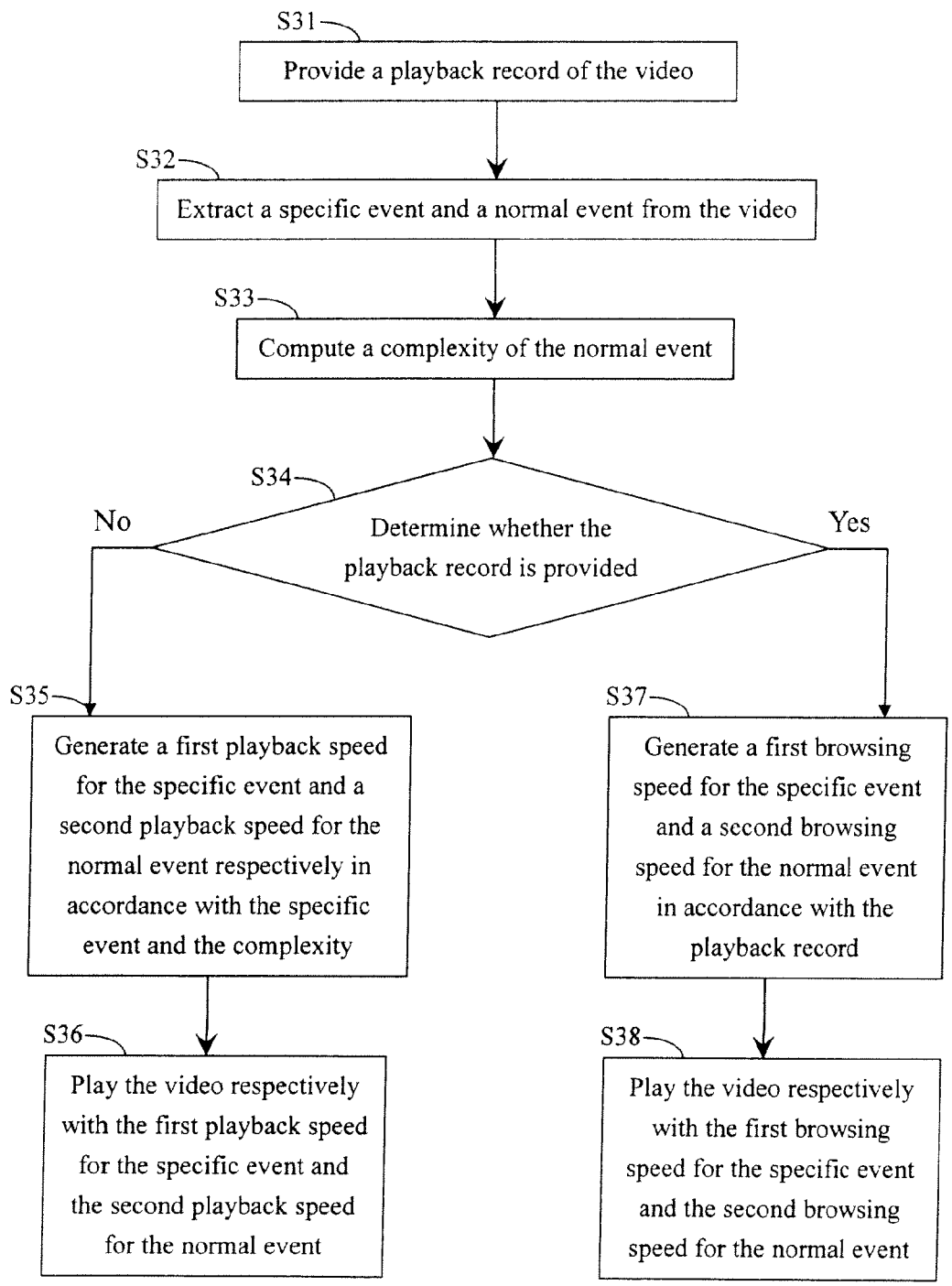
FIG. 3 is a diagram which schematically illustrates a process for the video playback method according to the second preferred embodiment of the present invention.

FIG. 3 schematically illustrates a process for the video playback method according to the second preferred embodiment of the present invention. A video playback method for playing a video having a specific event and a normal event, includes steps of: (S31) providing a playback record of the video; (S32) extracting a specific event and a normal event from the video; (S33) computing a complexity of the normal event; (S34) determining whether the playback record is provided; (S35) generating a first playback speed for the specific event and a second playback speed for the normal event respectively in accordance with the specific event and the complexity if the playback record of the video is absent; (S36) playing the video respectively with the first playback speed for the specific event and the second playback speed for the normal event; (S37) generating a first browsing speed for the specific event and a second browsing speed for the normal event in accordance with the playback record if the playback record is provided; and (S38) playing the video respectively with the first browsing speed for the specific event and the second browsing speed for the normal event.

In the second preferred embodiment of the present investment, there are some features similar thereto in the first preferred embodiment. In the step (S31), a preceding playback speed corresponding to the video previously played is recorded as the playback record. In the step (S32) the video is divided into the specific event and the normal event, wherein the specific event could be a sport event, an art event, a wedding event, a movie event, a news event or a combination thereof. This can prevent the conflict in deciding the specific playback speed after computing the complexity and extracting the event. For example, the complexity of the specific event is also computed. Therefore, when the specific playback speed is decided in the step (S36), there are some problems because of no dividing. In fact, since the computation of the complexity and the extraction of the specific event are performed at the same time, it is a better method to divide the video into the specific event and the normal event and then to decide the first playback speed and the second playback speed respectively therefor. It is other better method to decide the first playback speed for the specific event and then to decide the second playback speed for the normal in accordance with the complexity. In fact, the complexity and the specific event can be substituted by other features of the video. In other words, the first playback speed and the second playback speed could be generated in accordance with a plurality of video feature in the video. Hence, it is noted that the specification using the complexity of the invention are presented herein; it is not intended to be limited to the precise form disclosed.

Preferably, the formula 1 is used to compute the complexity in the step (S33), but it is not intended to be limited. The complexity of the normal event could be computed in accordance with a difference between two frames, a pixel difference between two frames, a pixel moving distance between two frames, or respective moving distances of a plurality of feature points between two frames, wherein two frames could be two specific ones of a plurality of frames in the normal event.

When the user inputs the resetting playback speed for one of the specific event and normal event, the specific playback speed such as the first browsing speed, the second browsing speed, the first playback speed and the second playback speed could be adjusted in accordance with the resetting playback speed by weightedly averaging the resetting playback speed and the specific playback speed. If the user tries to adjust the specific playback speed to form the resetting playback speed, it would be preferably adjusted by an adjusting unit being 0.1 time thereof. In addition, the specific playback speed is similar thereto in the first preferred embodiment to keep constant during playback of the video, wherein the playback interval is a shot, a scene, a sequence or the specific event.

Based on the above descriptions, it would be understood in the present invention that the specific playback speed can be generated in accordance with the video feature and further the user preferences. This can make the functions of the system more powerful than the functions of the commercial playback systems.

While the invention has been described in terms of what are presently considered to be the most practical and preferred embodiments, it is to be understood that the invention should not be limited to the disclosed embodiment. On the contrary, it is intended to cover numerous modifications and variations included within the spirit and scope of the appended claims which are to be accorded with the broadest interpretation so as to encompass all such modifications and variations. Therefore, the above description and illustration should not be taken as limiting the scope of the present invention which is defined by the appended claims.

What is claimed is:

1. A video playback method for playing a video having a specific event and a normal event, comprising steps of:
   (A) computing a video feature and generating a playback speed corresponding to the video feature for providing a playback record of the video;
   (B) generating a first browsing speed in accordance with the playback record;
   (C) playing the video with the first browsing speed if the specific event is played;
   (D) extracting the specific event and the normal event from the video;
   (E) computing a complexity of the normal event in accordance with a difference between two specific ones of a plurality of frames in the normal event;
   (F) generating a first playback speed and a second playback speed in accordance with the specific event and the complexity; and
   (G) playing the video respectively with the first playback speed for the specific event and with the second playback speed for the normal event if the playback record of the video is absent, and playing the video with a second browsing speed for the normal event if the playback record of the video is provided.

2. The video playback method as claimed in claim 1, wherein the video has a plurality of video features.

3. The video playback method as claimed in claim 1, wherein the step (E) further comprises at least one step of:
   computing the complexity of the normal event in accordance with a pixel difference between the two frames;
   computing the complexity of the normal event in accordance with a pixel moving distance between the two frames; and
   computing the complexity of the normal event in accordance with respective moving distances of a plurality of feature points between the two frames.

4. The video playback method as claimed in claim 1 further comprising a step of showing the specific event and the complexity on a user interface respectively by different colors.

5. The video playback method as claimed in claim 2 further comprising steps of:
   inputting a resetting playback speed; and
   adjusting the first and the second browsing speeds in accordance with the resetting playback speed.

6. The video playback method as claimed in claim 5 further comprising a step of weightedly averaging the resetting playback speed and one of the first and the second browsing speeds to adjust the first and the second browsing speeds.

7. The video playback method as claimed in claim 1 further comprising a step of playing the video with the specific playback speed during a playback interval of the video, wherein the playback interval is one selected from a group consisting of a shot, a scene, a sequence and the specific event.

8. The video playback method as claimed in claim 1, wherein the specific event is one selected from a group consisting of a sport event, an art event, a wedding event, a movie event, a news event and a combination thereof.

9. The video playback method as claimed in claim 1, wherein the playback record records a preceding playback speed corresponding to the video previously played, and the specific playback speed is adjusted by an adjusting unit being 0.1 time of the specific playback speed.

10. A video playback method for playing a video having a video feature and a playback record with a specific playback speed, comprising steps of:
    (A) generating the specific playback speed corresponding to the video feature for providing the playback record of the video;
    (B) detecting the video to obtain the video feature;
    (C) generating a first playback speed in accordance with the video feature;
    (D) generating a second playback speed in accordance with the playback record; and
    (E) determining the predetermined playback speed in accordance with the first playback speed and the second playback speed;
    (F) detecting whether a resetting playback speed is received; and
    (G) playing the video with the specific playback speed generated in accordance with the resetting playback speed and the predetermined playback speed if the resetting playback speed is received.

11. The video playback method as claimed in claim 10 further comprising a step of playing the video with the specific playback speed at a playback interval of the video, wherein the playback interval is one selected from a group consisting of a shot, a scene, a sequence and a specific event.

12. The personal video playback method as claimed in claim 10, wherein the specific playback speed is adjusted by an adjusting unit being 0.1 time of the specific playback speed.

13. The personal video playback method as claimed in claim 10, wherein the step (G) further comprises steps of:
    playing the video with the specific playback speed generated in accordance with the predetermined playback speed if the resetting playback speed is absent; and
    generating the specific playback speed by weightedly averaging the resetting playback speed and the predetermined playback speed.

14. A video playback system for playing a video having a plurality of frames with a specific playback speed, comprising:
    a video feature processor computing a video feature;
    a speed regulator coupled to the video feature processor and determining the specific playback speed in accordance with the video feature;
    a recording unit coupled to speed regulator and recording a playback record of the played video based on the specific playback speed;
    wherein the video has a plurality of frames and the system further comprises:
    a micro processor coupled to the recording unit and generating a browsing speed in accordance with the playback record;
    a motion processor detecting a difference between two specific ones of the plurality of frames to compute a video complexity;
    an event processor detecting the video to extract a specific event therefrom; and
    a speed regulator coupled to the micro processor, the motion processor and the event processor and determining the specific playback speed in accordance with one selected from a group consisting of the specific event, the video complexity, the browsing speed, and a combination thereof.

15. The video playback system as claimed in claim 14, wherein the motion processor computes the complexity in accordance with the difference being one selected from a group consisting of a pixel differences between the two frames, a moving distance of a specific pixel between the two frames, and respective moving distances of a plurality of feature points between the two frames and a combination thereof, and the specific event is one selected from a group consisting of a sport event, an art event, a wedding event, a movie event, a news event and a combination thereof.

16. The video playback system as claimed in claim 14, wherein the speed regulator keeps the specific playback speed in constant during a playback interval of the video, generates a first playback speed and a second playback speed respectively in accordance with the specific event and the video complexity, and chooses one of the first playback speed and the second playback speed to be the specific playback speed under a predefined condition, and the playback interval is one selected from a group consisting of a shot, a scene, a sequence and the specific event.

17. The video playback system as claimed in claim 14, wherein the micro processor receives a resetting playback speed and weightedly averages the resetting playback speed and the specific playback speed to generate a preferable browsing speed to play the video.

* * * * *